US006755969B2

(12) United States Patent
Kirker et al.

(10) Patent No.: US 6,755,969 B2
(45) Date of Patent: Jun. 29, 2004

(54) CENTRIFUGE

(75) Inventors: Curtis Kirker, Kamuela, HI (US); Berkeley F. Fuller, Kamuela, HI (US)

(73) Assignee: Phase Inc., Kamuela, HI (US)

(*) Notice: Subject to any disclaimer, the term of this patent is extended or adjusted under 35 U.S.C. 154(b) by 0 days.

(21) Appl. No.: 10/131,102

(22) Filed: Apr. 24, 2002

(65) Prior Publication Data

US 2002/0158008 A1 Oct. 31, 2002

Related U.S. Application Data

(60) Provisional application No. 60/286,745, filed on Apr. 25, 2001.

(51) Int. Cl.[7] ............................ B01D 21/26; B04B 1/12

(52) U.S. Cl. .................... 210/232; 210/360.1; 210/377; 210/378; 210/380.1; 494/36; 494/44; 494/56; 494/60

(58) Field of Search .............................. 210/232, 360.1, 210/377, 378, 380.1; 494/36, 44, 56, 60; 55/345

(56) References Cited

U.S. PATENT DOCUMENTS

| | | | |
|---|---|---|---|
| 2,028,168 A | 1/1936 | Roberts | 210/76 |
| 2,538,529 A | 1/1951 | Komline | |
| 2,688,437 A | 9/1954 | Monnet | |
| 3,327,401 A | 6/1967 | Stamos et al. | 34/4 |
| 3,937,317 A | 2/1976 | Fleury, Jr. | 198/213 |
| 3,960,318 A | 6/1976 | Dahlberg | |
| 3,967,778 A | 7/1976 | Hunwick | |
| 3,977,515 A | 8/1976 | Lewoczko | 198/213 |
| 4,005,817 A | 2/1977 | Charlton | |
| 4,015,773 A | 4/1977 | Thylefors | |
| 4,067,494 A | 1/1978 | Willus | |

(List continued on next page.)

FOREIGN PATENT DOCUMENTS

| | | | |
|---|---|---|---|
| DE | 1 632 324 | 10/1970 | B04B/3/20 |
| EP | 0346056 | 12/1989 | B04B/1/08 |
| FR | 870540 | 3/1942 | 14/6 |
| FR | 1 038 726 | 10/1953 | |
| JP | 11330379 | 10/1999 | |
| JP | 2001113204 A | 4/2001 | |
| WO | WO 00/02663 | 1/2000 | B04B/1/00 |
| WO | 02/42004 A1 | 5/2002 | B04B/15/06 |

OTHER PUBLICATIONS

PTO 03–2985–Patent & Trademark Office Translation of German Patent Published Patent Application No. 1 632 324, published on 10–1970.*

English Abstract from the Patent Abstracts of Japan along with a Machine Translation of the rest fo the specification of Japanese Patent Publication JP2001113204 A. JP200113204 A was published on Apr. 2001.

Search Report from PCT US 02/13186, mailed Sep. 10, 2002.

International Search Report PCT/US 99/15891, 6 pages, Jul. 12, 1999.

International Search Report PCT/US 02/36830, 8 pages, Mar. 12, 2003.

*Primary Examiner*—David A. Reifsnyder
(74) *Attorney, Agent, or Firm*—Baker Botts L.L.P.

(57) ABSTRACT

A centrifuge with specific wall and opening shapes for receptacles is disclosed. A centrifuge may include a fluid separation wall aligned substantially parallel to an axis of rotation and include an inner surface, a void area, and an outer surface. The inner surface may be placed in contact with the fluid medium. The inner surface may include at least one receptacle. The receptacle may aid in separation of the more dense particles from the fluid medium. The centrifuge may further include at least one fluid flow path extending through the separation wall from the inner surface to the outer surface. The fluid flow path may transport the more dense particles to the containment zone.

31 Claims, 7 Drawing Sheets

U.S. PATENT DOCUMENTS 4,070,290 A 1/1978 Crosby ........................ 210/91
4,103,822 A 8/1978 Stroucken
4,251,023 A 2/1981 Hohne
4,298,162 A 11/1981 Hohne
4,311,270 A 1/1982 Hovstadius
4,331,270 A 5/1982 Humlong .................. 224/32 R
4,343,431 A 8/1982 Wehling
4,375,870 A 3/1983 Bodelson ..................... 494/40
4,379,976 A 4/1983 Pitchford ..................... 310/83
4,381,849 A 5/1983 Conant ........................ 494/43
4,430,221 A 2/1984 Spiewok .................. 210/380.1
4,504,262 A 3/1985 Forsberg ...................... 494/53
4,505,697 A 3/1985 Lee et al. ..................... 494/35
4,519,496 A 5/1985 Ludvegsen .................. 198/676
4,569,761 A 2/1986 Spiewok et al. ......... 210/380.1
4,581,896 A 4/1986 Andresen ..................... 60/487
4,629,564 A 12/1986 Pinato
4,643,709 A 2/1987 Lee et al. ..................... 494/37
4,698,053 A 10/1987 Stroucken .................... 494/70
4,701,158 A 10/1987 Inge et al. .................... 494/74
4,710,159 A 12/1987 Gullers ........................ 494/27
4,721,505 A 1/1988 Inge et al. .................... 494/74
4,729,759 A 3/1988 Krook ........................... 494/4
4,784,634 A 11/1988 Schiele ........................ 494/56
4,813,923 A 3/1989 Johansson .................... 494/48
4,820,256 A 4/1989 Nordstrom ..................... 494/3
4,840,612 A 6/1989 Pallmar ......................... 494/1
4,861,329 A 8/1989 Borgstrom et al. ........... 494/67
4,978,331 A 12/1990 Luchetta ...................... 494/37
5,045,049 A 9/1991 Lantz .......................... 494/70
5,052,996 A 10/1991 Lantz .......................... 494/68
5,197,939 A 3/1993 Cederkvist ................... 494/53
5,202,024 A 4/1993 Andersson et al. ......... 210/360
5,244,584 A 9/1993 Schlieperskoetter ........ 210/787
5,362,292 A 11/1994 Borgstrom et al. ........... 494/74
5,374,234 A 12/1994 Madsen ....................... 494/53
5,380,434 A 1/1995 Paschedag .................. 210/360
5,397,471 A 3/1995 Rodebush ................... 210/360
5,429,581 A 7/1995 Michand ...................... 494/54
5,601,522 A 2/1997 Piramoon ................... 156/172
5,759,744 A 6/1998 Brueck et al. .............. 430/312
6,033,564 A 3/2000 Kirker et al. ............... 210/232
6,149,572 A 11/2000 Knelson
6,248,053 B1 6/2001 Ehnstrom et al. ............. 494/56
6,312,610 B1 11/2001 Kirker et al. ............... 210/781
6,322,698 B1 11/2001 Rios et al. ............. 210/321.75

* cited by examiner

FIG. 9A
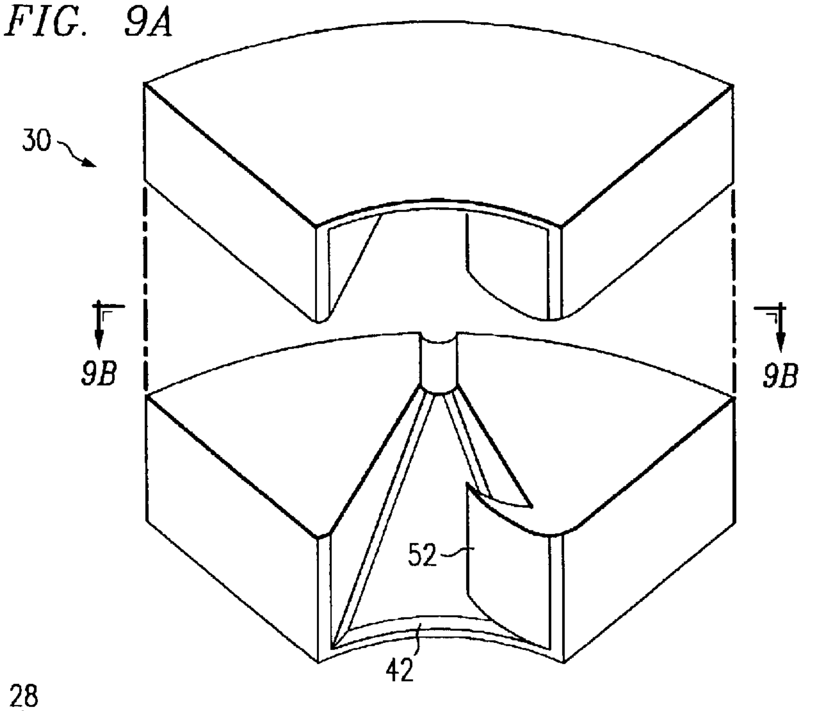
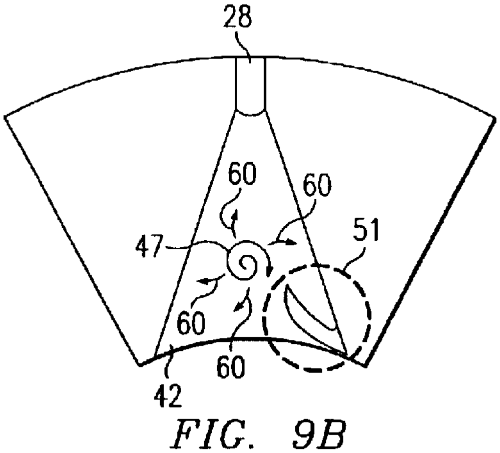
FIG. 9B
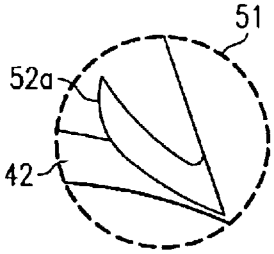
FIG. 10A
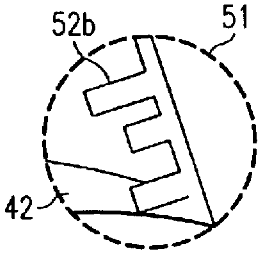
FIG. 10B
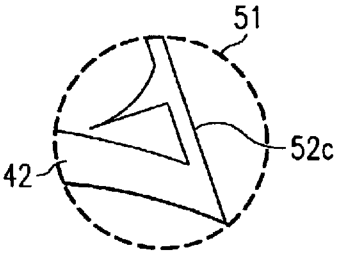
FIG. 10C

CENTRIFUGE

CROSS REFERENCE TO RELATED APPLICATION

This application claims the benefit of U.S. Provisional Patent Application Serial No. 60/286,745 filed Apr. 25, 2001, and entitled "Specific Wall and Opening Shapes for Receptacles Arrayed Around a Centrifugal Separator."

TECHNICAL FIELD OF THE INVENTION

This disclosure relates in general to the field of centrifugal separators, and more particularly to a centrifuge having replaceable internal components.

BACKGROUND OF THE INVENTION

Over the past several years, demand has increased for the efficient removal of contaminants from water supplies. Because of their relatively small size, many light density contaminants (e.g., microorganisms) have failed to be removed by conventional processing methods including fluid separation.

Fluid separation may include any process that captures and removes materials from a liquid stream, typically resulting in a clarified liquid having reduced contaminants and a denser stream containing removed contaminants. Further treating the denser stream in a thickening process may remove additional liquid to leave a thick, pump-able slurry mixture containing nine to approximately twelve percent solids by weight. Under certain conditions, a de-watering process may remove more water from the slurry mixture. The de-watering process may create a stackable but still moist mixture of approximately twelve to thirty percent solids by weight. In an extreme de-watering process, the resulting mixture may comprise up to forty percent solids by weight. In treating a clarified liquid, an associated clarifying process may remove suspended solid particles leaving a substantially further clarified fluid.

One type of fluid separation technique may include a membrane filtration process. Typically, a membrane filtration process removes particles from a liquid by retaining the particles in a filter of a specific size suited for a particular application. Some examples of membrane filtration processes include microfiltration, ultrafiltration, and nanofiltration. For insoluble particles, microfiltration can be used to retain and remove these particles from a liquid. Ultrafiltration may define a purification process that serves as a primary purification filter to isolate a desired solid product of a specific size. A nanofiltration process may be used in a final purification process to remove contaminants as small as microscopic bacterial cyst.

Another example of a fluid separation technique may include centrifugal separation. In centrifugal separation, a centrifuge may use centrifugal force to separate more dense contaminants from a fluid medium to leave a clarified fluid. By creating a centrifugal force several times greater than gravity, more dense contaminants separate from the fluid medium. To create centrifugal force within the centrifuge, the fluid medium is often placed within a chamber that rotates along a symmetrical axis creating the centrifugal force in a radial direction away from the symmetrical axis. More dense contaminants suspended in the fluid medium are forced against an outer wall of the rotating chamber and may pass through openings in the chamber to an outer catchment basin. The resulting clarified fluid, which is less dense, remains near the axis of rotation and may typically be removed from the chamber via a clarified fluid outlet.

One method of controlling a centrifugal separation process is to vary the centrifugal force within the chamber. To increase the centrifugal force, either the diameter of the rotating chamber and/or the rotational speed of the chamber can be increased. While increasing rotational speed of a centrifuge may increase the centrifugal force in order to remove smaller, less dense contaminants, problems may also be created by the additional centrifugal force.

Some of the problems associated with increasing centrifugal force within a chamber include burst pressure, balancing, and abrasion. Because more dense contaminants are generally forced against the outer wall or walls of the rotating chamber, burst pressure limits of materials used to form the outer wall or walls may become a critical design element of the chamber. Dynamic balancing of the rotating chamber may also become a problem when wall thickness is increased to provide a higher burst pressure design and/or when rotation speeds are increased. When centrifugal force is increased, the velocity of the more dense contaminants may increase causing any particulate matter to travel at high speeds. The high speed of the more dense particles may impart an abrasive quality when particulate matter contacts the walls of the chamber, which may eventually ablate the chamber walls.

As more dense contaminants are extracted from a fluid medium, the openings formed in the wall that allow the more dense contaminants to be expelled from the rotating chamber may become clogged with particulate matter or solids. Despite high centrifugal force, particulate matter may clog the openings and create a build up of relatively solid materials behind this "clog-point". Once an opening is clogged, the centrifuge must be stopped and the clog cleared in order for the centrifuge to be returned to service.

Another problem may exist due to the increased rotation of the chamber. As the chamber rotates around a center axis, inertia or momentum of the fluid medium being rotated may develop an inner swirling pattern within the chamber, known as a cyclonic vorticity. Because this vorticity often creates an agitation within the associated chambers, it may be desired to avoid this cyclonic vorticity effect by limiting rotational speeds.

SUMMARY OF THE INVENTION

In accordance with teachings of the present invention, disadvantages and problems associated with a centrifuge have been substantially reduced or eliminated. In one embodiment, a centrifuge for removing more dense particles or other more dense contaminants from a fluid medium may include a separation wall placed within a non-rotating sleeve to form a containment zone for the more dense particles or other more dense contaminants therebetween. The separation wall may include an inner surface, a center section, and an outer surface. The separation wall may be aligned generally parallel with an axis of rotation and rotate around the axis of rotation. One or more receptacles may be formed in the separation wall in accordance with teachings for the present invention. Each receptacle may include a respective geometry formed on the inner surface and a respective shape formed in the center section to define a void area to aid in separation of the more dense particles and other dense contaminants. The separation wall may also include an opening extending through the separation wall from the inner surface to the outer surface. This opening may transport the more dense particles and other contaminants to the containment zone.

In another embodiment of the present invention, a method of constructing a centrifuge for separating more dense particles from a fluid medium may include providing a centrifuge core disposed within a non-rotating sleeve. The centrifuge core may include a separation wall with an inner surface, a center section and an outer surface. One or more receptacles may be formed on the inner surface of the separation wall. Each receptacle may aid in separation of the more dense particles from a fluid medium. The method may include forming the centrifuge core from a plurality of generally cylindrical discs. Alternatively the centrifuge core may be formed from a plurality of generally longitudinal wedges. The method may include aligning the generally cylindrical discs or generally longitudinal wedges along an axis of rotation. The centrifuge core may rotate around this axis causing a centrifugal force to be imparted on the more dense particles to separate them from the fluid medium.

In a further embodiment of the present invention, a method of removing more dense particles from a fluid medium may include forming a centrifuge with a centrifuge core disposed within an outer non-rotating collecting sleeve. The centrifuge core may include a separation wall having at least one receptacle with an opening and a flow path extending therethrough. By rotating the centrifuge core around an axis of rotation, a centrifugal force may be created. The more dense particles may be removed through an opening in the receptacle and through the flow path to the outer non-rotating collecting sleeve. The method may include creating a cyclonic vorticity within the receptacle. The cyclonic vorticity may aid in preventing the more dense particles from clogging the opening.

One technical advantage of the present invention may include prevention of clogging of openings in a fluid separation wall. In some embodiments of the present invention, an anti-clogging projection may be placed in the opening to prevent clogging by the more dense particles. The anti-clogging projection may be formed within the inner surface of a nozzle to create a turbulent flow out of the nozzle. The turbulent flow may prevent blockage as the more dense particles exit the nozzle.

Another technical advantage of the present invention includes disrupting any cyclonic vorticity created in a void area of a receptacle. Placing an anti-vorticity projection in a receptacle may prevent formation of a cyclonic vorticity within the void area of the receptacle. Preventing this vorticity may enhance separation of the more dense particles from the fluid medium.

A further technical advantage of the present invention may include varying the velocity of separation of the more dense particles in the fluid medium. Forming steep or shallow walls on an interior of the receptacle walls may create a frictional force as the more dense particles move towards the opening. This frictional force may vary depending upon the angle or slope of the receptacle walls. By increasing the angle or slope, such as adding a steep wall, the more dense particles may move more rapidly toward the opening. This may decreases the separation effects caused the centrifugal force since less dense fluid may be carried out opening along with the more dense fluid. Providing a shallow sloped wall on the interior of the receptacle allows frictional forces to slow the speed of the particles, which permits additional removal of liquids such as water from the particles as they move more slowly along the walls of the receptacle towards the opening.

All, some or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 9A and 9B illustrate a perspective and cross-sectional view of a receptacle including an example embodiment of an anti-vorticity projection formed on the inner surface of the receptacle according to the teachings of the present invention; and FIGS. 10A through 10C illustrate example embodiments of various anti-vorticity projections formed in a receptacle according to the present invention.

DETAILED DESCRIPTION OF THE INVENTION

Preferred embodiments of the present invention and their advantages are best understood by reference to FIGS. 1 through 10C where like numbers are used to indicate like and corresponding parts.

Figure 1:
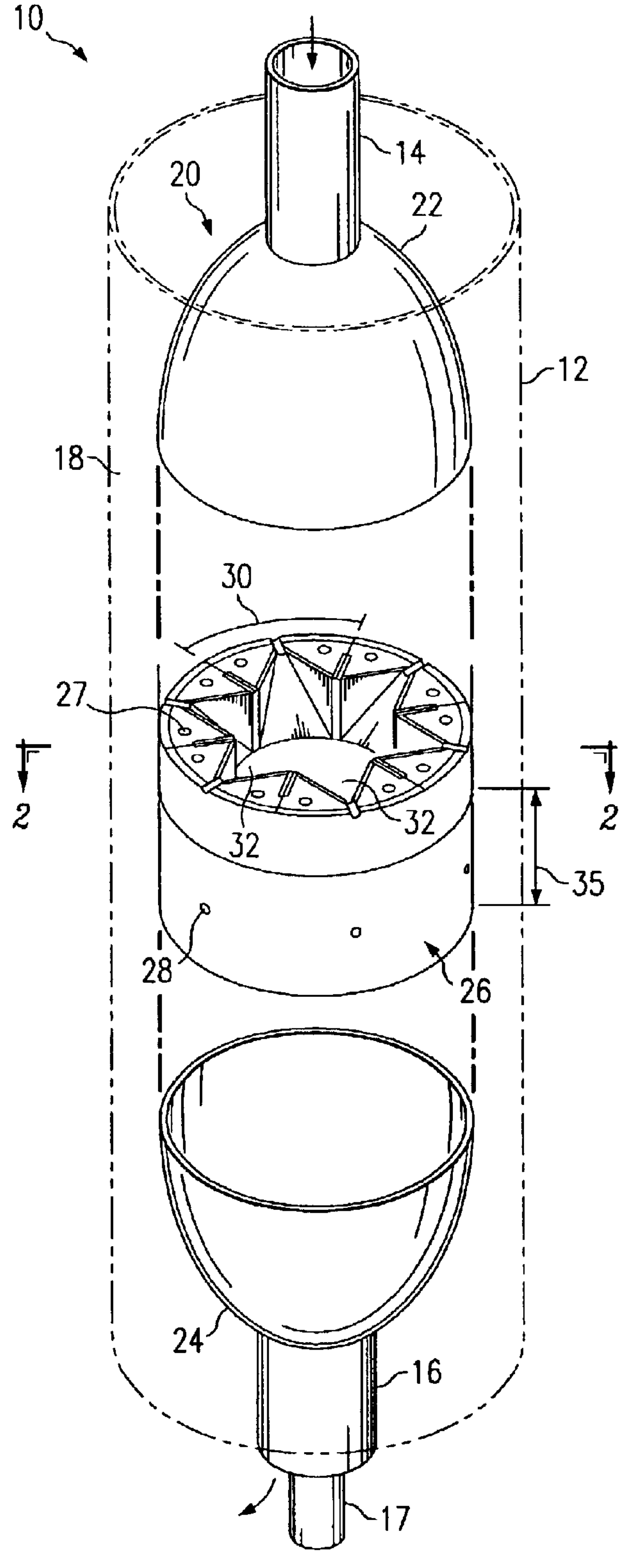
FIG. 1 illustrates a schematic drawing showing an isometric view with portions broken away of a centrifuge incorporating teachings of the present invention.

FIG. 1 illustrates a schematic drawing showing an isometric view with portions broken away of a centrifuge 10. Centrifuge 10 may include centrifugal core 20 disposed within non-rotating outer sleeve 12. Centrifugal core 20 may include fluid medium inlet 14, clarified fluid outlet 16, and fluid separation wall 26. Fluid separation wall 26 may be encapsulated between first housing cover 22 and second housing cover 24.

Non-rotating outer sleeve 12 may form accumulation area or containment zone 18 between centrifugal core 20 and non-rotating outer sleeve 12. Accumulation area 18 may collect more dense particles and other contaminants that have been separated from the fluid medium and have passed through openings 28. As the more dense particles collect within accumulation area 18, the heavy density particles may flow between centrifugal core 20 and non-rotating outer sleeve 12 away from centrifuge 10.

Fluid medium inlet 14 may be attached to upper housing cover 22 to provide an opening into centrifuge 10 for the fluid medium. Although fluid medium inlet 14 is shown attached to first housing cover 22, fluid medium inlet 14 may be positioned at any location on centrifugal core 20.

Clarified fluid outlet 16 may be formed in second housing cover 24. Clarified fluid outlet 16 may be used for removal of the clarified fluid after the more dense particles are removed through openings 28 in fluid separation wall 26.

Figure 2:
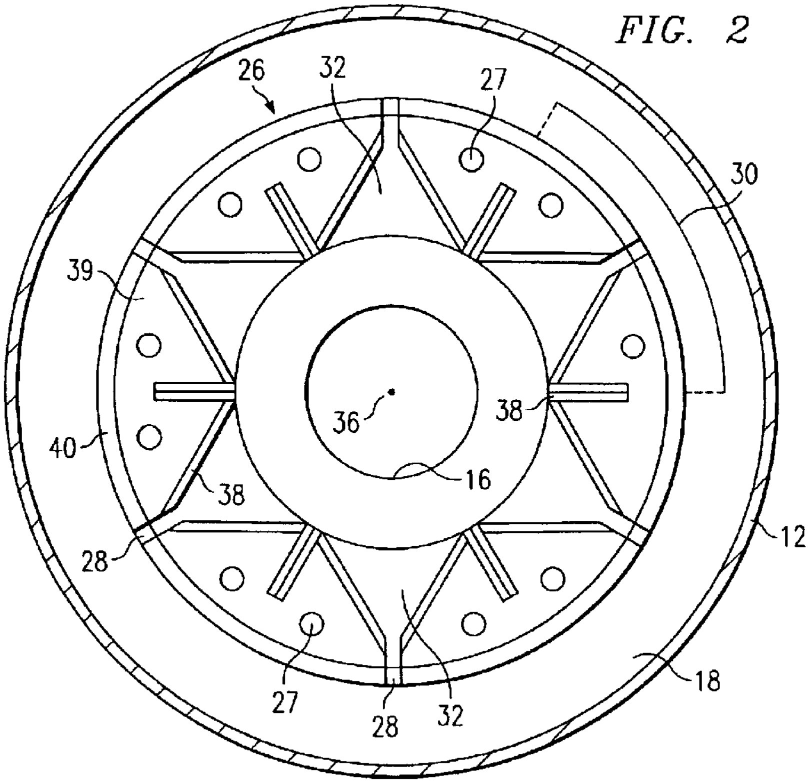
FIG. 2 illustrates a schematic drawing in section taken along lines 2—2 of FIG. 1.

Fluid separation wall 26 may be disposed between first housing cover 22 and second housing cover 24. First housing cover 22 and second housing cover 24 may be used to form the end pieces of centrifugal core 20 with fluid separation wall 26 disposed therebetween. Fluid separation wall 26 may be formed from various sections and include various receptacles with respective geometries and shapes. These various sections may include several horizontal layers of receptacles stacked together to form fluid separation wall 26. Alternatively, fluid separation wall 26 may be formed from several vertical sections of receptacles placed together to form fluid separation wall 26. For some embodiments, first housing cover 22 and second housing cover 24 may be attached with long bolts (not expressly shown) through bolt holes 27, as shown in FIG. 2, to hold together the various sections and components of fluid separation wall 26.

Centrifugal core 20 may be designed to rotate within non-rotating sleeve 12. This rotation may create a centrifugal force to separate the more dense particles from a fluid medium. In some embodiments, a transmission shaft 17 may rotate centrifugal core 20 to create the centrifugal force. The rotation of transmission shaft 17 may develop a centrifugal force within centrifugal core 20 in the range of approximately five hundred to approximately eight thousand gravities, depending on the speed and the diameter of centrifugal core 20. By providing a large centrifugal force within centrifugal core 20 such as eight thousand gravities, more dense particles as small as approximately 0.5 microns in size may be separated from the fluid medium. In some embodiments, centrifuge 10 imparts a centrifugal force on the fluid medium for removal of particulate matter in the range of approximately three millimeters to approximately 0.5 microns.

As the fluid is affected by the centrifugal force, the varying densities within the fluid medium are separated with the heavier, more dense particles being forced towards non-rotating outer sleeve 12. As these more dense particles approach the opening 28 in fluid separation wall 26, the centrifugal force is at its maximum due to the distance from an axis of rotation. The particles exiting through openings 28 may be disposed on non-rotating outer sleeve 12. The remaining fluid, or clarified fluid, contained within the innermost part of fluid separation wall 26 may overflow centrifugal core 20 into clarified fluid outlet 16. Depending upon the extraction rate of the particles, more fluid medium may be placed within centrifugal core 20. Typically, the flow rate of fluid medium into centrifugal core 20 may be in the range of approximately thirty to approximately five hundred gallons per minute. In some embodiments, the flow rate of the fluid medium is approximately sixty to one hundred and twenty-five gallons per minute.

Fluid separation wall 26, encased within first housing cover 22 and second housing cover 24, may include receptacle 30 formed on fluid separation wall 26. Receptacle 30 may include a specific geometry and a specific shape leading to opening 28. Depending on the respective geometry and shape of receptacle 30, the centrifugal forces within receptacle 30 may alter the separation effects of the more dense particles from the fluid medium.

FIG. 2 illustrates a cross-sectional view of centrifuge 10. Centrifugal core 20 may be formed from inner surface 38, middle layer 39, and outer surface 40 arranged around axis of rotation 36. Centrifugal core 20 may include at least one receptacle 30 having at least one opening 28.

Inner surface 38 may contact a fluid medium and may receive a geometry to form receptacle 30. Because inner surface 38 may be ablated by the fluid medium, inner surface 38 may be formed by replaceable inserts. Typically, inner surface 38 may include a thin stainless steel, ceramic, plastic, urethane, or any material and/or coating suitable for providing a interior wear layer. In one embodiment, inner surface 38 includes a replaceable urethane lining set over middle layer 39. In some embodiments, middle layer 39 may include bolt holes 27 to receive long bolts (not expressly shown) that may hold segments of fluid separation wall 26 in a fixed position.

Middle layer 39 may provide support and structure to centrifugal core 20 and may include a shape formed in receptacle 30 to contain the fluid medium. The shape of receptacle 30 may create void area 32 that aids in the separation of the more dense particles from the fluid medium under a centrifugal force. Typically, middle layer 39 may be formed from a urethane, filler material, polymer, or any other suitable material to provide a shape for inner surface 38.

Outer surface 40 may be formed adjacent to non-rotating outer sleeve 12 and may include opening 28. Typically, outer surface 40 may include an outer strength layer of wound or braided, carbon or graphite filament with a resin, metal, carbon-filled polymer, glass-filled polymer, high-strength composite plastic, or any other suitable material used to provide a high burst strength.

Opening 28 may provide a path for the more dense particles, combined with some fluid medium, to be removed from receptacle 30 to accumulation area 18. Typically, opening 28 may include a nozzle formed in receptacle 30, an insert device, or any suitable connection to provide a path for the more dense particles to travel out of receptacle 30 to accumulation area 18.

Because centrifugal core 20 may be centered on axis of rotation 36, the rotation of centrifugal core 20 may create a centrifugal force with the force being directed away from axis of rotation 36. As the fluid medium enters centrifugal core 20, the heavy particles within the fluid medium are driven outwards in a radial direction extending from axis of rotation 36 towards receptacle 30. The centrifugal force created by the rotation of centrifuge core 20 may increase as the particles more further away from axis of rotation 36. The increasing force may force the more dense particles out through opening 28 to be disposed in accumulation area 18 formed between non-rotating outer sleeve 12 and centrifugal core 20. Opening 28 may form a part of receptacle 30, allowing for heavy sediment particles and some fluid medium to pass through receptacle 30 from inner surface 38 of fluid separation wall 26 to the non-rotating outer sleeve 12.

Figure 3B:
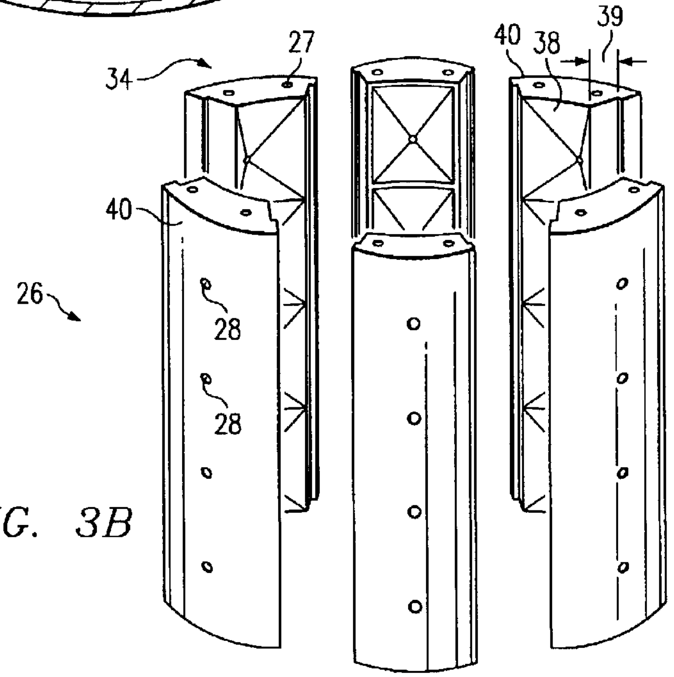
FIG. 3B illustrates a perspective view of a fluid separation wall defined in part by a receptacle wedge incorporating teachings of the present invention.
Figure 3A:
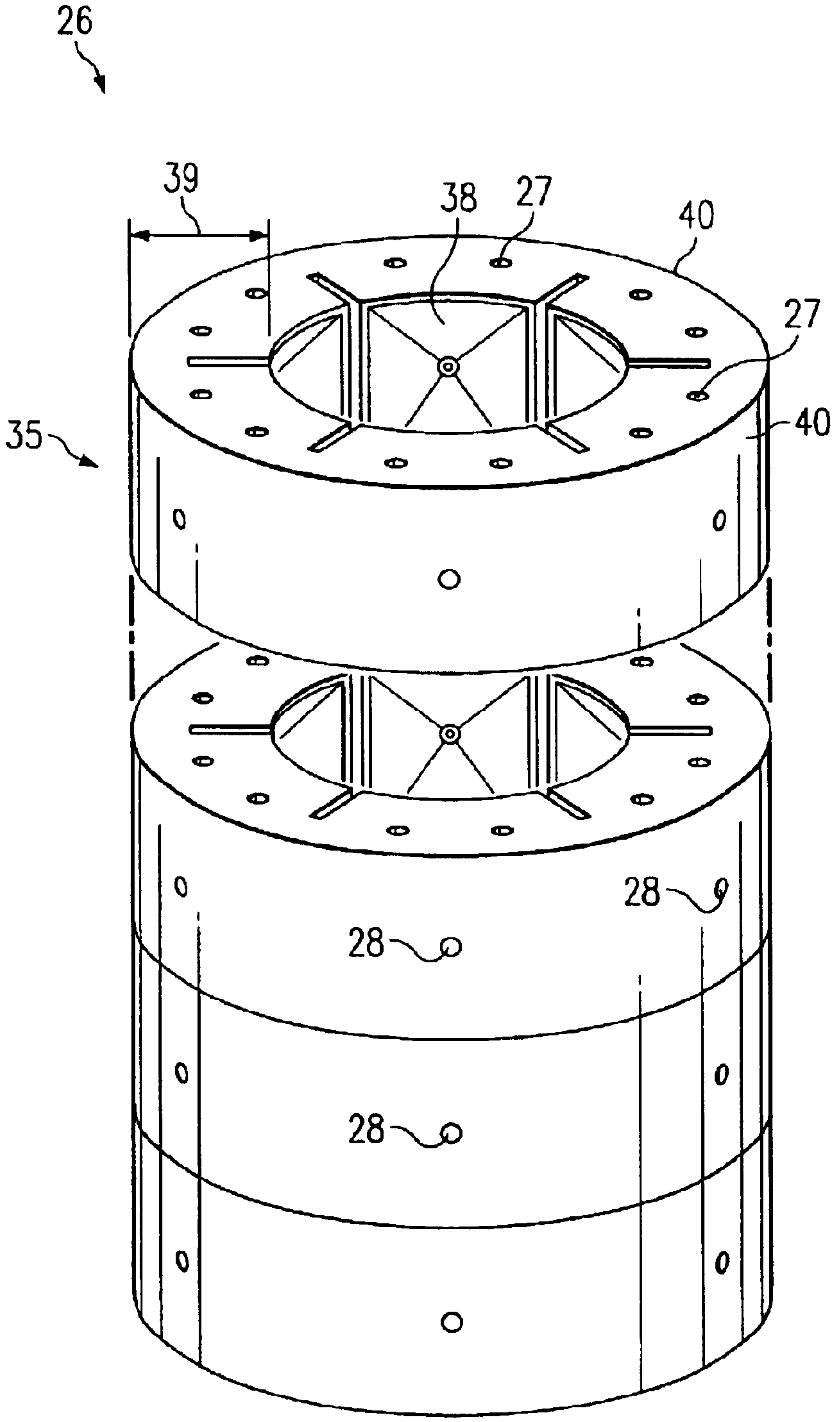
FIG. 3A illustrates a perspective view of a fluid separation wall defined in part by a receptacle disc incorporating teachings of the present invention.

FIGS. 3A and 3B illustrate a perspective view of fluid separation wall 26 having replaceable receptacle 30. In certain embodiments, fluid separation wall 26 may include receptacle 30 assembled in a modular fashion. Each component of fluid separation wall 26 may be pieced together to form a completed wall unit.

Receptacle 30 may include at least one opening 28 in each receptacle, however the number of openings may vary depending upon the configuration of receptacle 30. Receptacle 30 may form a replaceable insert that may be used to assemble fluid separation wall 26 in a modular fashion. In some embodiments, fluid separation wall 26 may be formed by replaceable inserts including a stack of receptacle discs 35. Receptacle discs 35 may include a circular formation of receptacles 30 arranged to be inserted between first housing cover 22 and second housing cover 24. Alternatively, fluid separation wall 26 may be formed with receptacle wedge 34 of receptacles 30. Single receptacle wedge 34 may include at least one receptacle 30 placed to form one section of fluid separation wall 26. By placing receptacle wedge 34 adjacent to other receptacle wedges 34 in a "pie" arrangement, fluid separation wall 26 may be formed in modules and enclosed by first housing section 22 and second housing section 24. Receptacle wedge 34 and receptacle disc 35 may be produced by investment casting, machine stamping, or any other suitable means of forming the respective receptacle shapes.

Figure 4:
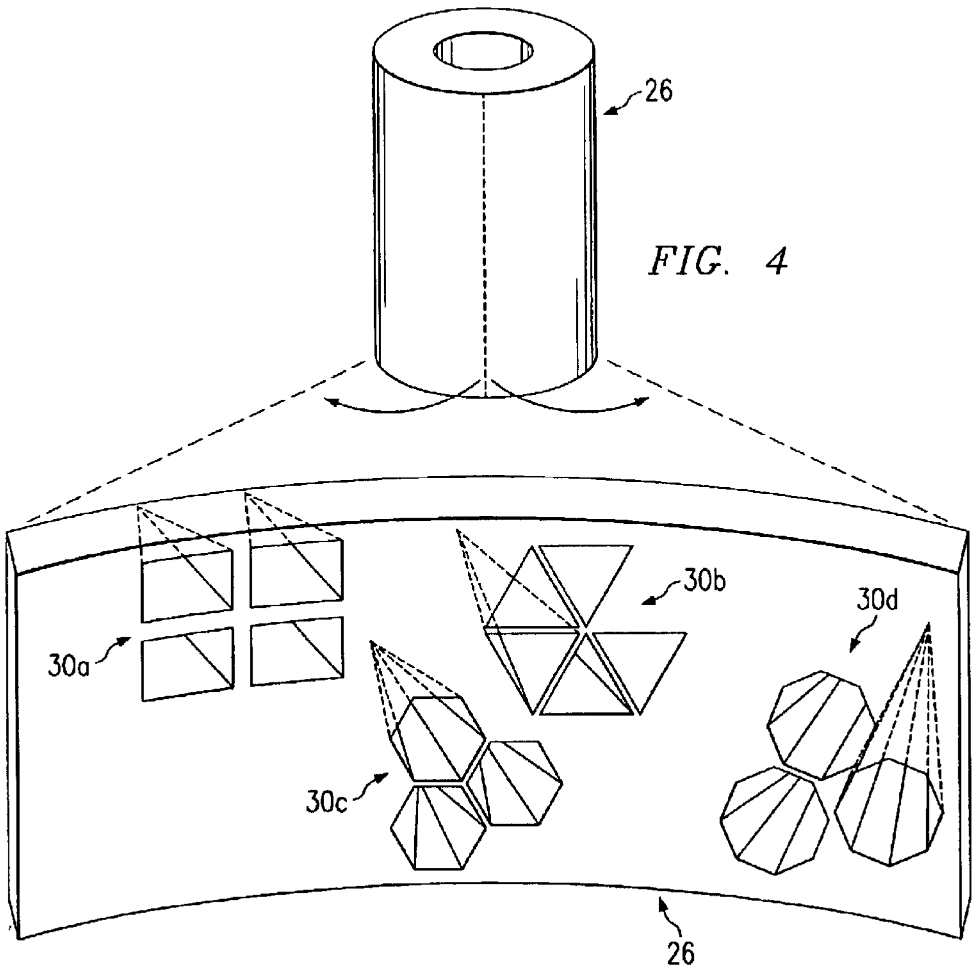
FIG. 4 illustrates a perspective view of the fluid separation wall including example embodiments of receptacles incorporating teachings of the present invention.

FIG. 4 illustrates a perspective view of fluid separation wall 26 including example embodiments of receptacle 30*a*, 30*b*, 30*c*, 30*d*. Depending on a particular separation application, receptacle 30 may include a variety of geometries formed on separation wall 26 and may further include a variety of shapes formed within middle layer 39. In some embodiments, receptacle 30*a*, 30*b*, 30*c*, 30*d* may be formed in a honeycomb fashion along inner surface 38 of fluid separation wall 26 to separate the more dense particles from the fluid medium.

Depending upon the application of the fluid separation, the geometry selected may include four-sided receptacle 30*a*, triangular receptacle 30*b*, hexagonal receptacle 30*c* or octagonal receptacle 30*d*. Other geometries of receptacle 30 formed on inner surface 38 may include a triangle, square, a rectangular, a trapezoid, a diamond, a rhombus, a pentagon, a hexagon, an octagon, a circle, an oval, a multi-walled shape, or any other geometry suitable to form receptacle 30 on inner surface 38.

In addition to forming a specific geometry, receptacle 30 may include a variety of shapes. The shape of receptacle 30 formed in middle layer 39 may include a pyramidal, a triangular, a pentagonal, hexagonal, octagonal, trapezoidal, or any other multi-walled shape operable to provide a void area within fluid separation wall 26. The shapes of receptacle 30 may further be defined to include curved walls, compound curved walls, steep sloped walls, shallow sloped walls, straight walls, flat walls, asymmetric shaped walls, irregular shaped walls, any combination thereof, or any other wall shape suitable to form receptacle 30 within middle layer 39.

In some embodiments, receptacle 30 may include a geometry formed on the interior wall of fluid separation wall 26 having converging sloped walls leading from the interior surface of fluid separation wall 26 to a center opening 28 in the exterior portion of fluid separation wall 26. In certain embodiments, receptacle 30 may be formed with several receptacles 30 arranged in a honeycomb fashion. In another embodiment, receptacle 30 may be arranged to comprise an area of eighty percent or higher of the total surface of fluid separation wall 26. Depending upon the application requiring centrifugal separation, fluid separation wall 26 may include combinations of different shaped receptacles 30 formed on inner surface 38. In further embodiments, receptacle 30 may comprise a combination of the different geometries and shapes to form fluid separation wall 26.

Figure 5A:
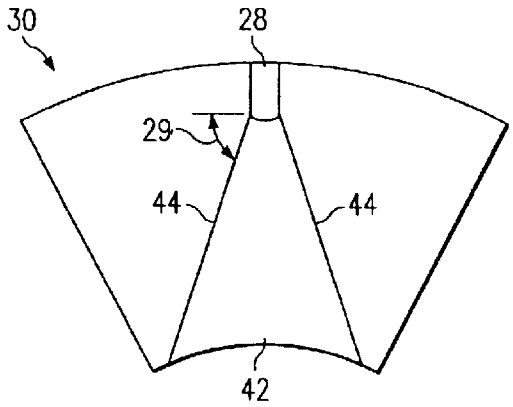
FIGS. 5A and 5B illustrate a perspective and cross-sectional view of an example embodiment of a receptacle having straight sloped sidewalls according to the teachings of the present invention.
Figure 5B:
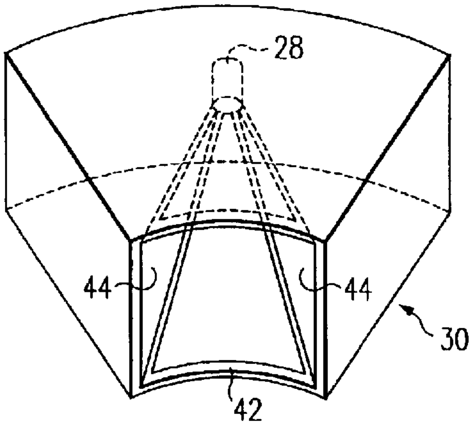

FIGS. 5A and 5B illustrate a perspective and cross-sectional view of an example embodiment of receptacle 30 having straight sloped sidewall 44. Straight sloped sidewalls 44 may include various degrees of slopes on the interior wall of receptacle 30. In certain embodiments, the various slopes may include angle of slope 29. Angle of slope 29 may be measured from a plane perpendicular to an axis of opening 28 to a slope on the interior wall. Preferably, angle of slope 29 for straight sloped sidewall 44 includes wall slopes formed by angles measuring between twenty degrees and sixty degrees.

As the fluid medium enters centrifugal core 20, the centrifugal force imparted on the fluid medium may separate the more dense particles by forcing the particles towards opening 28 in fluid separation wall 26. The more dense particles may enter receptacle 30 at receptacle entrance 42. Receptacle 30 may include straight sloped sidewall 44 to create a centrifugal force that is uniform along the slope of the sidewall as it leads towards opening 28. The increasing centrifugal force on the more dense particles allows separation at a uniform rate as the more dense particles are accelerated towards opening 28.

By increasing angle of slope 29 to create a steeper sloped wall, the more dense particles may move more rapidly with the centrifugal force towards opening 28. In contrast, decreasing angle of slope 29 on receptacle 30 may increase frictional forces between the more dense particles on straight sloped sidewall 44 as the more dense particles move towards opening 28. The increasing frictional force may be caused by the increase in centrifugal force as the more dense particles move farther away from axis of rotation 36.

Figure 6A:
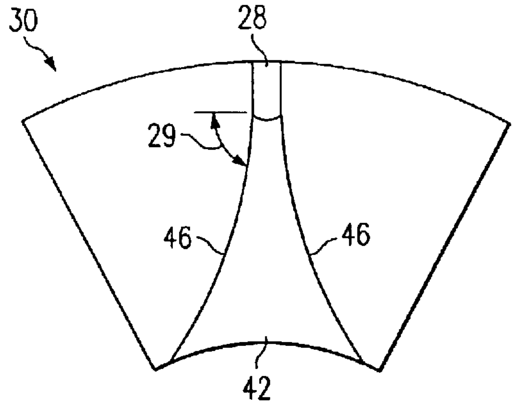
FIGS. 6A and 6B illustrate a perspective and cross-sectional view of an example embodiment of a receptacle having a compound curved sidewalls according to the teachings of the present invention.
Figure 6B:
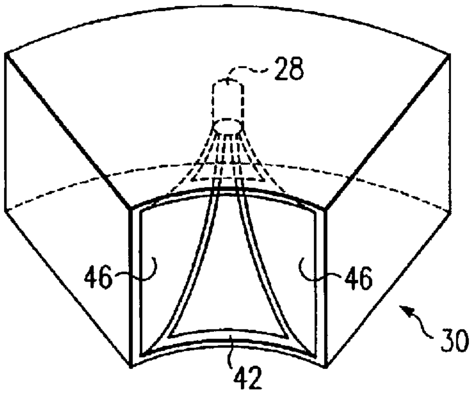

FIGS. 6A and 6B illustrate a perspective and cross-sectional view of an example embodiment of receptacle 30 having a compound curved sidewall 46. Compound curve sidewall 46 may include varying angles from receptacle entrance 42 to opening 28. In certain embodiments, compound curve sidewall 46 may include angle of slope 29. Angle of slope 29 may vary from receptacle entrance 42 leading down to opening 28. The varying degrees of angle of slope 29 may include a range of less than or equal to ninety degrees formed near opening 28 to an angle of approximately thirty-seven degrees near the receptacle entrance 42. These varying degrees along the wall may create a frictional force that is greater at receptacle entrance 42 than near opening 28.

Depending on angle of slope 29 forming compound curved sidewall 46, more dense particles from the fluid medium may encounter high frictional wall forces resulting in a slower separation rate from the fluid medium. As these more dense particles move down along receptacle 30 towards opening 28, the wall frictional force may decrease due to an increase in angle of slope 29 on compound curved sidewall 46. This increase may result in a reduction in the frictional force imparted on the more dense particles as they move down receptacle 30 towards opening 28. In addition to the reduction of frictional force, the centrifugal force imparted on the more dense particle may increase as the distance from axis of rotation 36 increases. The centrifugal force combined with the increasingly steep angle of compound curved sidewall 46 may cause the more dense particles to accelerate. As the particles near the opening 28, the more dense particles may have minimal wall friction compared to the outward centrifugal force. As the particles enter opening 28 of receptacle 30, the frictional force may be insignificant compared to the centrifugal force causing the more dense particles to become densely packed at the exit of opening 28. This compaction of more dense particles near the exit of opening 28 may provide additional clarification of the fluid medium due to the compaction being under high pressure. Because the extracted clarified fluid is less dense, the fluid may be forced towards center of centrifugal core 20 near the axis of rotation 36. However, the more dense particles may be expelled through opening 28 to be deposited in accumulation area 18.

Figure 7A:
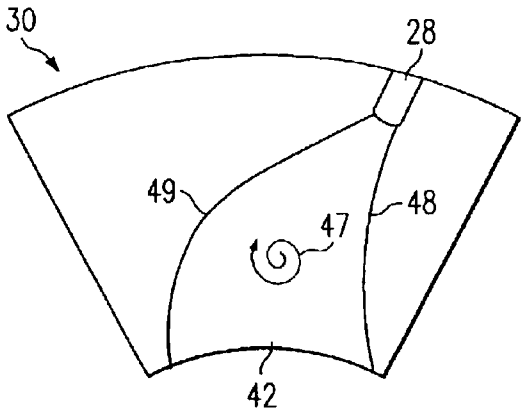
FIGS. 7A and 7B illustrate a perspective and cross-sectional view of an example embodiment of a receptacle having a shallow sloped wall and a steep sloped wall according to the teachings of the present invention.
Figure 7B:
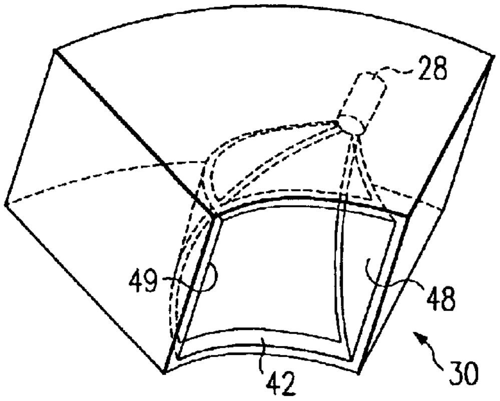

FIGS. 7A and 7B illustrate a perspective and cross-sectional view of an example embodiment of receptacle 30 having steep sloped sidewall 48 and shallow sloped sidewall 49 formed on inner surface 38 of fluid separation wall 26. As the fluid medium enters receptacle 30 at receptacle entrance 42, cyclonic vorticity 47 may be created by the rotation of centrifugal core 20 around axis of rotation 36. Cyclonic vorticity 47 may form a swirling motion within inner surface 38 of void area 32 due to the inertial effects of the fluid medium being accelerated around axis of rotation 36. Because receptacle 30 may include the two curved walls, namely steep sloped sidewall 48 and shallow sloped sidewall 49, each wall may be differently affected by cyclonic vorticity 47. In certain embodiments, cyclonic vorticity 47 causes the more dense particles to be swept away from shallow sloped sidewall 49 towards opening 28. Alternatively, the more dense particles falling along steep slope sidewall 48 towards opening 28 may have sufficient velocity and force to overcome the effects of cyclonic vorticity 47.

Aided by cyclonic vorticity 47, receptacle 30 may encourage these differing velocities of the more dense particles exiting through opening 28 creating different flow rates. These differing flow rates may prevent the development of a clog within opening 28. Additionally, the force of the faster particles may also aid in breaking apart any particles beginning to form a plug in opening 28.

Figure 8A:
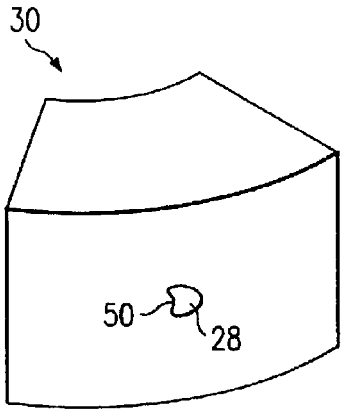
FIGS. 8A and 8B illustrate two perspective views of example embodiments of an opening formed in a receptacle on the interior wall of the centrifugal separator according to the teachings of the present invention.
Figure 8B:
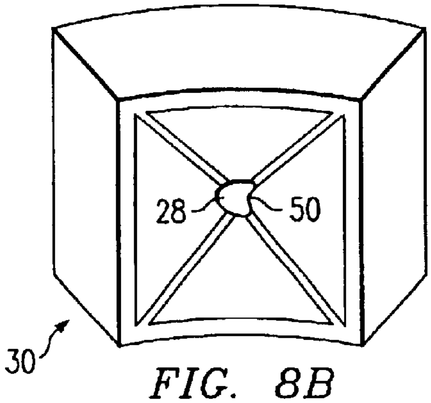

FIGS. 8A and 8B illustrate two perspective views of an example embodiment of anti-clogging projection 50 formed on the interior wall of opening 28 located in receptacle 30. Incorporating anti-clogging projection 50 with opening 28 may create a keystone effect by providing a differential flow rate through opening 28 to reduce the possibilities of clogging. The keystone effect may describe the effect anti-clogging projection 50 imparts to the fluid medium as the more dense particles flow through opening 28. The anti-clogging effect may disrupt the formation of a clog within opening 28. Typically, anti-clogging projection 50 creates a differential flow rate through opening 28 such that removal of any small portion of a potential clog, namely a keystone, results in a fracture or break down of the potential clog.

Anti-clogging projection 50 may be any formation or internal shape placed in combination with opening 28. The internal shape formed may include any shape suitable for causing the differential flow rate through opening 28. In one embodiment, anti-clogging projection 50 includes a notch extending the length of opening 28. In an alternative embodiment, anti-clogging projection 50 includes an enlargement within opening 28 to create a differential flow rate along opening 28.

FIGS. 9A and 9B illustrate a perspective and cross-sectional view of receptacle 30 including an example embodiment of anti-vorticity projection 52 formed on inner surface 38. Cyclonic vorticity 47 caused by the rotation of centrifuge 10 may be disrupted with the use of anti-vorticity projection 52. Anti-vorticity projection 52 may extend into void area 32 of receptacle 30. Anti-vorticity projection 52 may include any shape or protrusion extending into void area 32 of receptacle 30 that creates chaos 60 within the fluid medium. Chaos 60 may include any alteration, disruption, modification, reduction, or acceleration of the flow pattern of the fluid medium created by cyclonic vorticity 47 or any other flow pattern in the fluid medium.

In some embodiments, anti-vorticity projection 52 includes a hook-like shape positioned near receptacle entrance 42 and extending into void area 32. This hook-like shape may be multi-sided, pointed, conical, or any other shape suitable to create chaos 60 within receptacle 30. In some embodiments, anti-vorticity projection 52 may cause a disruption of cyclonic vorticity 47 by disrupting the fluid path within void area 32. The disruption may cause a back flow of fluid current against cyclonic vorticity 47, thus disbursing the cyclonic flow. In other embodiments, receptacle 30 may include one or more anti-vorticity projections 52 on inner surface 38 of receptacle 30. Anti-vorticity projection 52 may include a hook-like shape, a pointed shape, a square shape, a combination of shapes, or any other shape suitable to cause a disruption of cyclonic vorticity 47 within void area 32.

FIGS. 10A–10C illustrate example embodiments of various anti-vorticity projection 52 formed in receptacle 30. Hook-like projection 52*a* may include a long fingerlike projection into void area 32 of receptacle 30 to disrupt cyclonic vorticity 47. Square projections 52*b* and pointed projection 52*c* may also be used to create chaos 60 within void area 32. Disrupting cyclonic vorticity 47 may allow for greater separation of more dense particles from the fluid medium.

What is claimed is:

1. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall including an inner surface, a middle section, and an outer surface;

the fluid separation wall aligned generally parallel to an axis of rotation and operable to rotate around the axis of rotation;

the fluid separation wall including a receptacle defined in part by a respective geometry formed on the inner surface and a respective shape formed in the middle section to form a void space between the inner and outer surface;

the receptacle operable to aid in separation of the more dense material from the fluid medium;

the respective shape including a wall shape selected from the group consisting of a curved wall, a compound curved wall, an asymmetric shaped wall, an irregular shaped wall, and any combination thereof;

the respective geometry selected from the group consisting of a triangle, a square, a rectangle, a trapezoid, a diamond, a rhombus, a pentagon, a hexagon, an octagon, a circle and an oval;

at least one flow path extending through the fluid separation wall from the void space to the outer surface; and the flow path operable to transport the more dense material to the containment zone.

2. The centrifuge of claim 1, wherein the fluid separation wall further comprises a plurality of the receptacles forming a honeycomb pattern on the inner surface.

3. The centrifuge of claim 1, wherein each receptacle comprises a wall slope between the range of approximately twenty degrees to approximately ninety degrees.

4. The centrifuge of claim 1, further comprising multiple receptacles which form approximately eighty percent or more of a total surface area of the separation wall.

5. The centrifuge of claim 1, wherein each receptacle comprises:

a projection extending into the associated void space of the receptacle; and the projection operable to aid in preventing formation of a cyclonic vorticity within the receptacle shape.

6. The centrifuge of claim 1, wherein the at least one flow path comprises a respective projection operable to aid in preventing more dense material from clogging the opening.

7. The centrifuge of claim 1, wherein the more dense material comprises heavy density particles.

8. The centrifuge of claim 1, wherein the fluid separation wall comprises a modular fluid separation wall defined in part by at least one generally cylindrical disc, wherein each of the at least one generally cylindrical disc includes multiple receptacles.

9. The centrifuge of claim 1, wherein the fluid separation wall comprises a modular fluid separation wall defined in part by at least one generally longitudinal wedge, wherein each of the at least one generally longitudinal wedge includes multiple receptacles.

10. A method of constructing a centrifuge for separating more dense material from a fluid medium, comprising:

forming a centrifuge core with a separation wall having an inner surface, a middle section, and an outer surface;

forming at least one receptacle in the separation wall to provide a void area to aid in separation of the more dense material from the fluid medium;

defining, within the at least one receptacle, a respective geometry along the inner surface and a respective shape within the middle section, such that the respective geometry and the respective shape aid in separation of the more dense material from the fluid medium;

forming an anti-vorticity projection to create chaos within the at least one receptacle to prevent the formation of a cyclonic vorticity;

placing an opening within the at least one receptacle extending from the void area to the outer surface to transport the more dense material to be disposed on a non-rotating sleeve;

placing the centrifuge core within the non-rotating sleeve; and aligning the centrifuge core for rotation along an axis of rotation to create centrifugal force to separate the more dense material from the fluid medium.

11. The method of claim 10, further comprising designing the centrifuge for a flow rate of approximately thirty to approximately five hundred gallons per minute.

12. The method of claim 10, further comprising designing the centrifuge for removal of the more dense material of approximately 0.5 microns.

13. The method of claim 10, further comprising designing the centrifugal force between a range of approximately five hundred to approximately eight thousand gravities.

14. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall including an inner surface, a middle section, and an outer surface;

the fluid separation wall aligned generally parallel to an axis of rotation and operable to rotate around the axis of rotation;

the fluid separation wall including a receptacle defined in part by a respective geometry formed on the inner surface and a respective shape formed in the middle section to form a void space between the inner and outer surface;

the receptacle operable to aid in separation of the more dense material from the fluid medium, an anti-vorticity projection forming a part of the respective shape and extending into the associated void space of the receptacle, the anti-vorticity projection operable to create chaos within the void space to prevent the formation of a cyclonic vorticity;

at least one flow path extending through the fluid separation wall from the void space to the outer surface; and the flow path operable to transport the more dense material to the containment zone.

15. The centrifuge of claim 14, wherein the fluid separation wall further comprises a plurality of the receptacles forming a honeycomb pattern on the inner surface.

16. The centrifuge of claim 14, further comprising the respective geometry selected from the group consisting of a triangle, a square, a rectangle, a trapezoid, a diamond, a rhombus, a pentagon, a hexagon, an octagon, a circle, an oval, and a multi-walled shape.

17. The centrifuge of claim 14, further comprising the respective shape selected from the group consisting of pyramidal, triangular, pentagonal, hexagonal, octagonal, trapezoidal, and multi-walled shape.

18. The centrifuge of claim 17, further comprising the multi-walled shape selected from the group consisting of a curved wall, a compound curved wall, a steep sloped wall, a shallow sloped wall, a straight wall, a flat wall, an asymmetric shaped wall, an irregular shaped wall, and any combination thereof.

19. The centrifuge of claim 14, wherein each receptacle comprises a wall slope between the range of approximately twenty degrees to approximately ninety degrees.

20. The centrifuge of claim 14, further comprising multiple receptacles which form approximately eighty percent or more of a total surface area of the separation wall.

21. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall including an inner surface, a middle section, and an outer surface;

the fluid separation wall aligned generally parallel to an axis of rotation and operable to rotate around the axis of rotation;

the fluid separation wall including a receptacle defined in part by a respective geometry formed on the inner surface and a respective shape formed in the middle section to form a void space between the inner and outer surface;

the receptacle operable to aid in separation of the more dense material from the fluid medium;

at least one flow path extending through the fluid separation wall from the void space to the outer surface, the at least one flow path operable to transport the more dense material to the containment zone; and an anti-clogging projection formed within the at least one flow path, the anti-clogging projection operable to disrupt the formation of a clog within the at least one flow path.

22. The centrifuge of claim 21, wherein the fluid separation wall further comprises a plurality of the receptacles forming a honeycomb pattern on the inner surface.

23. The centrifuge of claim 21, further comprising the respective geometry selected from the group consisting of a triangle, a square, a rectangle, a trapezoid, a diamond, a rhombus, a pentagon, a hexagon, an octagon, a circle, an oval, and a multi-walled shape.

24. The centrifuge of claim 21, further comprising the respective shape selected from the group consisting of pyramidal, triangular, pentagonal, hexagonal, octagonal, trapezoidal, and multi-walled shape.

25. The centrifuge of claim 24, further comprising the multi-walled shape selected from the group consisting of a curved wall, a compound curved wall, a steep sloped wall, a shallow sloped wall, a straight wall, a flat wall, an asymmetric shaped wall, an irregular shaped wall, and any combination thereof.

26. The centrifuge of claim 21, wherein each receptacle comprises a wall slope between the range of approximately twenty degrees to approximately ninety degrees.

27. The centrifuge of claim 21, further comprising multiple receptacles which form approximately eighty percent or more of a total surface area of the separation wall.

28. A method of constructing a centrifuge for separating more dense material from a fluid medium, comprising:

forming a centrifuge core with a separation wall having an inner surface, a middle section, and an outer surface;

forming at least one receptacle in the separation wall to provide a void area to aid in separation of the more dense material from the fluid medium;

defining, within the at least one receptacle, a respective geometry along the inner surface and a respective shape within the middle section, such that the respective geometry and the respective shape aid in separation of the more dense material from the fluid medium;

placing an opening within the at least one receptacle extending from the void area to the outer surface to transport the more dense material to be disposed on a non-rotating sleeve;

forming an anti-clogging projection in association with the opening to aid in preventing the more dense material from clogging the opening;

placing the centrifuge core within the non-rotating sleeve; and aligning the centrifuge core for rotation along an axis of rotation to create centrifugal force to separate the more dense material from the fluid medium.

29. The method of claim 28, further comprising designing the centrifuge for a flow rate of approximately thirty to approximately five hundred gallons per minute.

30. The method of claim 28, further comprising designing the centrifuge for removal of the more dense material of approximately 0.5 microns.

31. The method of claim 28, further comprising designing the centrifugal force between a range of approximately five hundred to approximately eight thousand gravities.

* * * * *